United States Patent [19]
Perlman et al.

[11] Patent Number: 5,128,926
[45] Date of Patent: Jul. 7, 1992

[54] UPDATING LINK STATE INFORMATION IN NETWORKS

[75] Inventors: Radia J. Perlman, Acton; Ross Callon, Bedford; Charles W. Kaufman, Northboro, all of Mass.

[73] Assignee: Digital Equipment Corporation, Maynard, Mass.

[21] Appl. No.: 496,632

[22] Filed: Mar. 21, 1990

[51] Int. Cl.$^5$ .......................... H04J 3/24; H04M 7/00
[52] U.S. Cl. ........................ 370/54; 370/60; 370/94.1; 340/827; 379/221
[58] Field of Search .................. 370/60, 60.1, 94.1, 370/13, 16, 54; 340/825.03, 826, 827; 379/219, 220, 221, 112, 113

[56] References Cited

U.S. PATENT DOCUMENTS

| | | | |
|---|---|---|---|
| 4,466,060 | 8/1984 | Riddle | 364/200 |
| 4,534,024 | 8/1985 | Maxemchuk et al. | 370/60 |
| 4,617,657 | 10/1986 | Drynan et al. | 370/60 |
| 4,656,658 | 4/1987 | King | 379/221 |
| 4,669,113 | 5/1987 | Ash et al. | 379/221 |
| 4,670,871 | 6/1987 | Vaidya | 370/60 |
| 4,679,189 | 11/1985 | Olson et al. | 370/60 |
| 4,691,314 | 10/1985 | Bergins et al. | 370/94.1 |
| 4,700,184 | 10/1987 | Noirel et al. | 340/825.5 |
| 4,704,724 | 11/1987 | Krishnan et al. | 379/221 |
| 4,706,080 | 11/1987 | Sincoskie | 340/825.02 |
| 4,737,983 | 4/1988 | Frauenthal et al. | 379/113 |
| 4,740,954 | 4/1988 | Cotton et al. | 370/60 |
| 4,742,511 | 5/1988 | Johnson | 370/94.1 |
| 4,788,721 | 11/1988 | Krishnan et al. | 379/221 |
| 4,825,206 | 5/1988 | Brice, Jr. et al. | 340/825.02 |
| 4,833,543 | 12/1986 | Verbiest | 358/260 |
| 4,875,208 | 10/1989 | Furuhashi et al. | 370/60 |

OTHER PUBLICATIONS

Dijkstra, "A Note on Two Problems in Connexion with Graphs", *Numerische Mathematik*, vol. 1 (1959), pp. 269-271.
McQuillan et al., "The New Routing Algorithm for the Arpanet", *IEEE Transactions on Communications*, vol. COM-28 (1980), pp. 711-719.
DARPA, "Internet Protocol".
OSPF, "The OSPF Specification".
ISO "8473 Protocol for Providing the Connectionless-mode Network Service".
ISO, "IS/IS Intra-Domain Routeing Exchange Protocol".
Perlman ("Fault-Tolerant Broadcast of Routing Information", Computer Networks 7 (1983), North-Holland, Inc., pp. 395-405.
Humblet et al. ("Topology Broadcast Algorithms", Computer Networks and ISDN Systems 16 (1988/89), North-Holland, Inc., pp. 179-186.
Bertsekas et al. (Chapter 5 of *Data Networks*, Prentice-Hall, Englewood Cliffs, NJ, 1987).
Perlman ("Network Layer Protocols with Byzantine Robustness", M.I.T. Ph.D. Thesis).

*Primary Examiner*—Stephen Chin
*Assistant Examiner*—Alpus H. Hsu
*Attorney, Agent, or Firm*—Fish & Richardson

[57] ABSTRACT

Stored information used for routing packets of a network of nodes interconnected by links. A link state packet is sent to the first node indicating the states of links connected to some given node in the network. At the first node, an attempt is made to derive from the link state packet sent in step (a), the states of the links. If the states of fewer than all of the links connected to the given node are derived in step (b), the stored information used for routing packets is updated using the derived link states without regard to other link state packets sent to the first node. Another aspect features organizing, at a node in a network of nodes interconnected by links, a database of entries concerning respective links, by (a) providing indicators associated with the entries, (b) when a link becomes inoperable, setting or clearing the indicator associated with the entry related to the link, and (c) when the link becomes operable, clearing or setting the indicator. Another aspect features organizing information concerning the states of links interconnecting nodes of a network of nodes, the information being grouped in link state packets indicating the states of links connected to respective source nodes. The link state packets are ordered, a range of the link state packets in the order is selected, and a summary is formed including information indicating the boundaries of the selected range, and information identifying each link state packet in the selected range.

34 Claims, 6 Drawing Sheets

| | |
|---|---|
| A { | NEIGHBOR 1 |
| | NEIGHBOR 2 |
| | ⋮ |
| | NEIGHBOR K |
| B { | NEIGHBOR K+1 |
| | NEIGHBOR K+2 |
| | ⋮ |
| | NEIGHBOR M |
| C { | NEIGHBOR M+1 |
| | NEIGHBOR M+2 |
| | ⋮ |
| | NEIGHBOR N |

FIG.5b

| | |
|---|---|
| A { | NEIGHBOR 1 |
| | NEIGHBOR 2 |
| | ⋮ |
| | NEIGHBOR K |
| B { | NEIGHBOR K+1 |
| | NEIGHBOR K+2 |
| | ⋮ |
| | EMPTY (M) |
| C { | NEIGHBOR M+1 |
| | EMPTY (M+2) |
| | ⋮ |
| | NEIGHBOR N |
| | NEIGHBOR N+1 |

| |
|---|
| SOURCE |
| FRAGMENT = 3 |
| SEQ. NUM = 24 |
| NEIGHBOR M+1 |
| NEIGHBOR M+3 |
| ⋮ |
| NEIGHBOR N |
| NEIGHBOR N+1 |

| |
|---|
| SOURCE |
| FRAGMENT = 2 |
| SEQ. NUM = 7 |
| NEIGHBOR K+1 |
| NEIGHBOR K+2 |
| ⋮ |
| NEIGHBOR M-1 |

FIG.5c

| | |
|---|---|
| A { | NEIGHBOR 1 |
| | NEIGHBOR 2 |
| | ⋮ |
| | NEIGHBOR K |
| B { | NEIGHBOR K+1 |
| | NEIGHBOR K+2 |
| | ⋮ |
| | EMPTY (M) |
| C { | NEIGHBOR M+1 |
| | NEIGHBOR M+2 |
| | ⋮ |
| | NEIGHBOR N |
| | NEIGHBOR N+1 |

| |
|---|
| SOURCE |
| FRAGMENT = 3 |
| SEQ. NUM = 25 |
| NEIGHBOR M+1 |
| NEIGHBOR M+2 |
| ⋮ |
| NEIGHBOR N |
| NEIGHBOR N+1 |

UPDATING LINK STATE INFORMATION IN NETWORKS

CROSS REFERENCE TO RELATED APPLICATIONS

This application is related to copending application Ser. No. 07/364,470 entitled RELIABLE BROADCAST OF INFORMATION IN A WIDE AREA NETWORK filed June 9, 1989 by Radia J. Perlman et al. and copending application Ser. No. 07/398,347 entitled ROBUST PACKET ROUTING OF A DISTRIBUTED NETWORK CONTAINING MALICIOUS FAILURES FILED Aug. 24, 1989 by Radia J. Perlman.

BACKGROUND OF THE INVENTION

The invention relates to updating link state information in networks.

Information is communicated through such a network along a myriad of links which interconnect nodes. The nodes may be routers, which receive and forward packets toward their destination along the appropriate links. Each router must know the states (e.g., operative or inoperative) of the links in the network in order to send packets along effective paths to their respective destinations, avoiding, for example, faulty links or routers. Schemes for communicating link state information and choosing effective (e.g., optimum) paths are known as routing algorithms.

In popular routing algorithms such as that described in "The New Routing Algorithm for the ARPANET" by McQuillan, Richer, and Rosen, *IEEE Transactions on Communications*, May, 1980, each node (e.g., router) determines which links are connected to it, the state of those links, and the identity of the node on the other end of each link. To initialize the network, each router places this information in a special packet known as a Link State Packet (LSP), and transmits this LSP to all of the other routers in the network. Later, when changes in the network occur (e.g., a link fails), one or more routers may generate new LSPs which supersede previously generated LSPs. As long as the most recent LSPs are propagated reliably to all of the routers, each router will have complete information about the current topology of the network and can thus use any well known algorithm to compute routes through the network (such as the Dijkstra algorithm described in "A Note on Two Problems in Connexion with Graphs" by Edsgar Dijkstra, Vol. 1, 1959, pages 269-271). However, if the transmission of LSPs becomes unreliable, then the network may eventually become incapable of transmitting data.

When a router receives an LSP, it compares the relative ages of the received LSP and any stored LSPs that were previously received from the same router. The received LSP is stored in place of the stored LSP if the received LSP is more current; otherwise, the stored LSP is retained and the received LSP is ignored. To allow routers to make a determination of the relative ages of LSPs, every LSP is assigned a sequence number; the sequence number of each LSP is greater than that of the LSP that preceded it.

Figure 1:
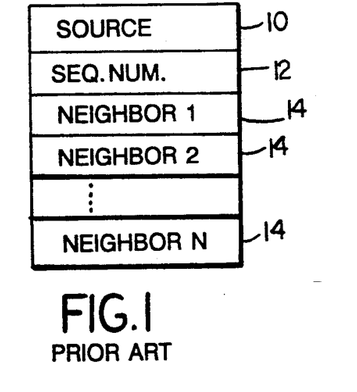
FIG. 1 illustrates the contents of a typical LSP.

Referring to FIG. 1, a typical LSP includes a source field 10 containing the name of the router that originated the LSP; a sequence number field 12 containing the sequence number for the LSP; and any number of neighbor fields 14, each of which indicates a neighbor node connected to the source router by a communications link.

When changes occur (e.g., the links connected to a router become operative or inoperative), a new version of the router's LSP is issued. In known LSP algorithms, to reflect these changes, fields are removed from or added to the LSP. In known LSP based routing algorithms, when a link connected to a router fails, the field corresponding to the link (i.e., the field indicating the neighbor to which the link connects) is removed from the router's LSP, and the router's LSP is retransmitted. When a link returns to operation, the field corresponding to the link is added back to the LSP, and the LSP is retransmitted.

In one algorithm for adding and removing fields from a LSP, when a field is removed, each of the fields below the removed field is moved to a position one field nearer to the beginning of the LSP. When a field is added, it is added to the end of the LSP. Thus, when a field near the beginning of the LSP is removed, most of the other fields in the LSP are repositioned.

The LSPs stored by two routers are often compared to determine if the LSPs being stored by one router are more recent than the LSPs being stored by one of its neighboring routers. Sometimes all of the LSPs being stored by two neighboring routers are compared. To accomplish this, one router forms a complete sequence number packet (CSNP) that lists all of the sequence numbers of all of the LSPs currently stored by the router.

Figure 2:
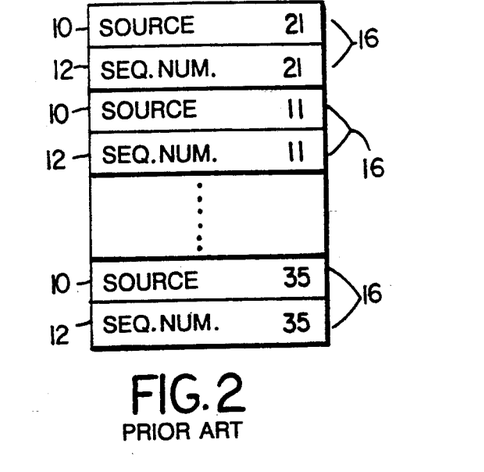
FIG. 2 illustrates the contents of a typical CSNP.

Referring to FIG. 2, a CSNP contains the sequence number field 12 of each LSP stored in the database of the router that generated the CSNP. However, these sequence numbers cannot be interpreted without also knowing the identity of the router that generated the sequence numbers. Therefore, the source field 10 of each LSP is paired with the sequence number 12 of the LSP (forming a pair 16).

In a large network, a router may be connected to many communications links, making that router's LSPs very long. Furthermore, there may be many nodes, and thus the CSNPs may also become very large. In general, the longer a packet, the more difficult it is to transmit the packet over a network.

Some network protocols establish a maximum size for packets to be transmitted. For example, on a local area network (LAN) configured in accordance with the IEEE 802.3 protocol (described in the IEEE 802.3 standard, available from the Institute for Electrical and Electronic Engineers, New York, NY), the maximum packet size is approximately 1500 bytes. In order to transmit large packets over such size-limited protocols, a routers must include interface software or hardware. Briefly, using such software or hardware, a sending router splits the large packet into pieces which are smaller than the maximum packet size. These pieces are then transmitted separately to a receiving node. The receiving node then re assembles the pieces, and the completed large packet is forwarded to a subsequent node (this forwarding may involve re splitting the packet for transmission over another size-limited protocol).

Even in protocols which are not size-limited, the larger a packet, the more likely that it will be corrupted by noise when sent along a link. Although communications faults occur at random, the larger a data packet is, the longer it will take to be sent over the link, and thus the more likely it is that a fault will occur during the transmission of the packet. Although it is common for data packets to be encoded with an error-checking algorithm (such as a checksum) which can determine if an error has corrupted the information in the packet, such error-checking algorithms typically do not provide for a way to correct the packet; rather, they can simply determine whether the packet is in error. Therefore, when a packet is received in error, it is discarded by the receiving router. The sending router then retransmits the packet. The increased probability of errors in transmitting large packets, coupled with the extra time required to transmit such packets, can result in a computation burden on network routers.

SUMMARY OF THE INVENTION

The invention assembles link state information concerning a given node of a network into multiple packets called fragments and sends the fragments to other nodes in the network to allow those other nodes to update their link state databases. A node (called a "first" node) to which a fragment is sent can use the link state information contained in that fragment without regard to whether or not other fragments are successfully received at that node.

In general, in one aspect, the invention features updating, at a first node of a network of nodes interconnected by links, stored information used for routing packets at the first node. A link state packet is sent to the first node indicating the states of links connected to some given node in the network. At the first node, an attempt is made to derive from the link state packet sent in step (a), the states of the links. If the states of fewer than all of the links connected to the given node are derived in step (b), the stored information used for routing packets is updated using the derived link states without regard to other link state packets sent to the first node.

Preferred embodiments include the following features. In the case when the states of all of the links connected to the given node are derived in step (b), the stored information used for routing packets is also updated using the derived link states. The link state packet is originated from the given node. At a second node of the network, stored information used for routing packets at the second node is also updated by sending a link state packet to the second node (e.g., the same link state packet as the one sent to the first node) indicating the states of links connected to the given node in the network. At the second node, an attempt is made to derive from the link state packet forwarded to the second node, the states of the links connected to the given node. The stored information used for routing packets at the second node is updated using the derived link states, whether all or fewer than all of the links connected to the given node have been derived.

Multiple link state packets are sent to the first node. Each packet indicates the states of one or more links connected to the given node. Not all of the link state packets indicate the states of the same links. A fragment number is included in each of the multiple packets for identifying the packet among the multiple packets. The given node is also identified within each of the multiple packets. Each link state packet includes a sequence number establishing the relative age of the packet among other packets identifying the given node and having the same fragment number. The link state packet indicates that a link connected to the given node is operative by identifying one or more other nodes that are connected to the operative link.

If a link connected to the given node changes from a first state to a second state, a determination is made whether the first state of the link was indicated in a previously sent link state packet, and if so a replacement packet is sent from the given node to the first node indicating the change of state of the link; conversely, if the first state of the link was not indicated in a previous packet, a link state packet is sent from the given node to the first node indicating that the link is in the second state. When a replacement packet is sent, an indicator is stored in the given node indicating the changes represented by the replacement packet. If the changed link subsequently changes from the second state back to the first state, the stored indicator is retrieved, a further replacement packet is formed based on the indicator, and the further replacement packet is sent to the first node.

Each link state packet indicates that a link connected to the given node is operative by identifying one or more nodes that are connected to the operative link, and indicates that a link connected to the given node is inoperative by omitting identification of any nodes that are connected to the inoperative link. The indicator includes a field for identifying a node and a flag bit for indicating the operability of the link connecting the identified node to the given node.

In general, in another aspect, the invention features organizing, at a node in a network of nodes interconnected by links, a database of entries concerning respective links, by (a) providing indicators associated with the entries, (b) when a link becomes inoperable, setting (or clearing) the indicator associated with the entry related to the link, and (c) when the link becomes operable, clearing (or setting) the indicator.

In general, in another aspect, the invention features organizing information concerning the states of links interconnecting nodes of a network of nodes, the information being grouped in link state packets indicating the states of links connected to respective source nodes. The link state packets are ordered, a range of the link state packets in the order is selected, and a summary is formed including information indicating the boundaries of the selected range, and information identifying each link state packet in the selected range.

Preferred embodiments of the invention include the following features. The ordering of the link state packets is performed in accordance with the identities of their respective source nodes. The link state packet identifies its source node. The boundaries of the selected range are indicated by the identities of the respective sources of the link state packets at the extremes of the range.

When a new link is initialized between first and second nodes in the network, a summary of link state packets stored by the first node is organized at the first node, the summary is sent to the second node and is compared at the second node with the link state packets stored by the second node. In some embodiments, such a summary is organized at a neighboring node connected by a link to the new node, the summary is sent to the new node, and compared, at the new node, with the link state packets stored by the new node, whereby it may be determined which packets being stored by the neighboring node are not being stored by the new node. In some embodiments, such a summary is organized at a designated router of a local area network, then sent to a second router on the network, and compared, at the second router, with the link state packets stored by the second router.

As a result, link state information may be efficiently organized and broadcast throughout a network.

Other features and advantages of the invention will be apparent from the following description of the preferred embodiment and from the claims.

DESCRIPTION OF THE PREFERRED EMBODIMENT

We first briefly describe the drawings.

In the invention, rather than sending long LSPs through the network, routers transmit link state information in several smaller link state packets (hereafter these smaller link state packets may simply be called fragments. Each fragment (link state packet containing partial link state information) is generated, transmitted, and used independently of other fragments. When one of the fragments is corrupted by noise during transmission, only the corrupted fragment is re-transmitted. Furthermore, when the state of a link changes, only a revised version of the affected LSP fragment (or a replacement packet) is transmitted.

Figure 3A:
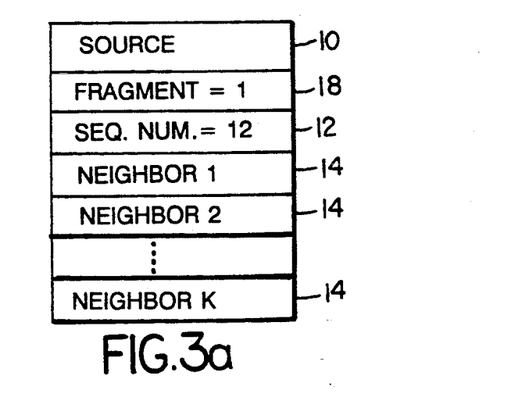
FIGS. 3A through 3C illustrate the contents of LSP fragments.
Figure 3B:
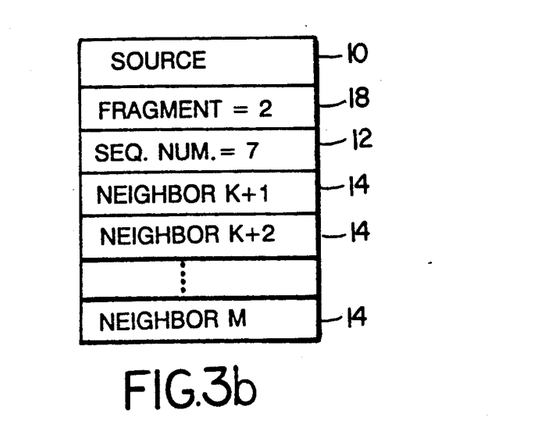
Figure 3C:
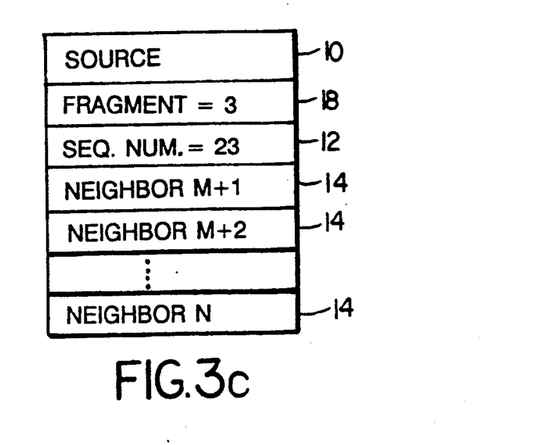

A typical set of fragments is illustrated FIGS. 3A through 3C. Taken together, the fragments illustrated in FIGS. 3A through 3C contain all of the neighbor fields of the prior art LSP of FIG. 1. However, each fragment contains only some of the neighbor fields that are contained in the prior art LSP of FIG. 1. Whereas the LSP in FIG. 1 contains fields for all neighbors (which are numbered 1 through N), the first fragment, shown in FIG. 3A, contains only neighbor fields 1 through K (where K<N); the second fragment, shown in FIG. 3B, contains only neighbor fields K+1 through M (where M<N); and the third fragment, shown in FIG. 3C, contains only neighbor fields M+1 through N.

Each fragment includes a field 10 indicating the source node; this field contains the same information as the source node field 10 of a prior art LSP (FIG. 1). In addition, each fragment includes a field 18 indicating the "fragment number", i.e., the fragment's location in the set of fragments that includes all of the link state information of a prior art LSP. Note that the fragment in FIG. 3A is indicated as fragment 1, the fragment in FIG. 3B is indicated as fragment 2, and so on.

Each fragment also includes a field 12 containing a sequence number. This field performs a similar function to the sequence numbers of complete LSPs; however, in this case the sequence number indicates the relative age of the fragment among the versions of the fragment that have been broadcast by the originating router. Because the fragments are independently updated in response to changes in the network, the sequence numbers of various fragments from the same originating node may be different; note that the sequence number of fragment 1 is 12, but the sequence number of fragment 2 is 7, and so on.

Figure 4:
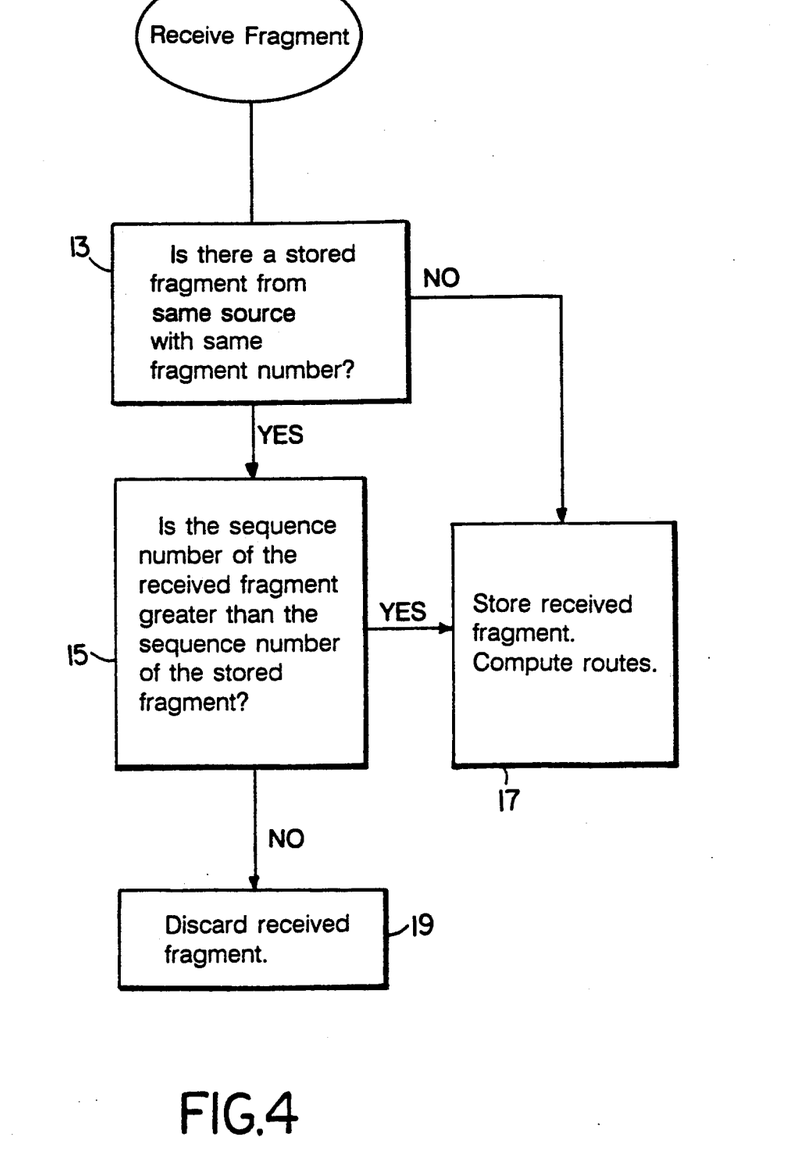
FIG. 4 is a flow chart of an algorithm for updating the contents of link state packet storage according to the invention.

Referring to FIG. 4, when a fragment is received by a router, the router searches 13 for any stored fragments having the same source and fragment number as the received fragment. If one is found, the router compares 15 the sequence number of the received fragment to the sequence number of the stored fragment. If the sequence number of the received fragment is higher, or if no stored fragment was found in step 13, the received fragment is stored 17. The router then computes routes through the network based on the link state information included in the received fragment (for example, by computing a routing table using Dijkstra's algorithm). Otherwise, if the stored fragment is more current, the stored fragment is retained and the received fragment is discarded 19.

Figure 5A:
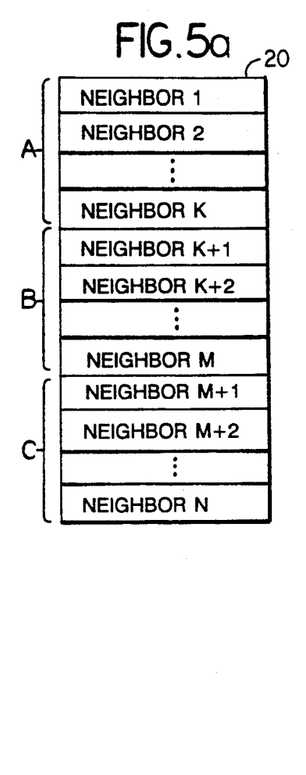
FIGS. 5A through 5C illustrate the contents of a node's link state database.

To enhance the operation of the invention, the relative positions of the neighbor fields of the LSP fragments are carefully maintained. FIG. 5A illustrates the contents of a router's link state database 20 (i.e., the database in the router that stores the states of all of the links connected to the router). The contents and organization of the database 20 correspond to the contents and organization of the fields in the LSP fragments of FIGS. 3A through 3C. The first K fields of the database are included in the fragment of FIG. 3A, fields K+1 through M of the database are included in the fragment of FIG. 3B, and fields M+1 through N of the database are included in the fragment of FIG. 3C.

Figure 5B:
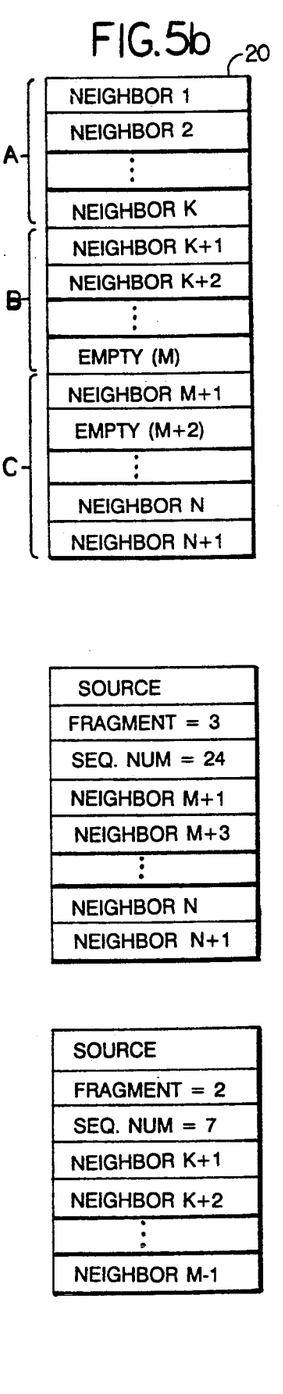

Referring to FIG. 5B, as the states of the links change, the corresponding fields in the link state database and the LSP fragments must change. In FIG. 5B, the links to neighbors M and M+2 have become disabled. In addition, a new link to a neighbor N+1 has become enabled. Because the links to neighbors M and M+2 are no longer operative, subsequent LSP fragments should not indicate these neighbors. Although these neighbors are to be removed from LSP fragments, in the router's database 20 the fields previously occupied by neighbors M and M+2 are not erased or re-used. Rather, the fields for neighbors M and M+2 are marked as "empty" (for example, by setting a flag bit); for future use, the identity of the neighbor that had previously been stored in the field is retained by the field (the identity of the previous occupant is illustrated in parentheses in FIG. 5B). When a new neighbor is added (if there is storage space available in the router's database 20), rather than re-using the fields marked as empty, a new field is added to the end of the database. In FIG. 5B, a new field has been created for new neighbor N+1.

New LSP fragments must be issued to convey the above link state changes to other nodes in the network. These new fragments are illustrated at the bottom of FIG. 5B. Because the field previously occupied by neighbor M is now marked as "empty" in the database 20, the new version of fragment 2 does not have a field for neighbor M, and ends with the field for neighbor M−1. Similarly, because the field previously occupied by neighbor M+2 is now "empty" in the database, the new version of fragment 3 does not have a field for neighbor M+2; the field for neighbor M+1 is followed immediately by the field for neighbor M+3. In addition, because new neighbor N+1 has been added to the database, the new version of fragment 3 ends with a field for the new neighbor N+1. (Alternatively, a new fragment, numbered 4, could be created to contain the field for neighbor N+1).

Figure 5C:
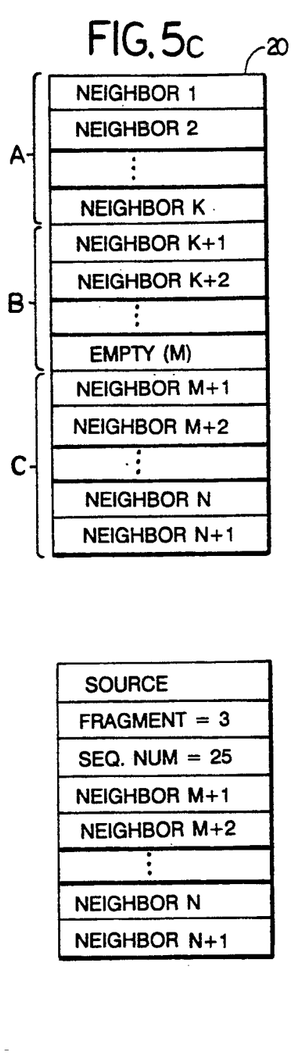

The states of the links may change again, for example, in FIG. 5C, the link to neighbor M+2 has again become enabled. In this case, because neighbor M+2 is identified as the previous occupant of a field marked "empty", neighbor M+2 is not added to the end of the data base 20. Rather, the field that previously contained neighbor M+2 is modified to not be marked as "empty" (i.e., its flag bit is cleared), and thus neighbor M+2 is again included in the link state database.

In response to the above changes in the link states, a new version of LSP fragment 2 must be issued. This new fragment is illustrated at the bottom of FIG. 5C. Because the field previously marked as "empty" is now occupied by neighbor M+2, the new version of fragment 2 has a field for neighbor M+2; the field for neighbor M+1 is followed immediately by the field for neighbor M+2.

Figure 6:
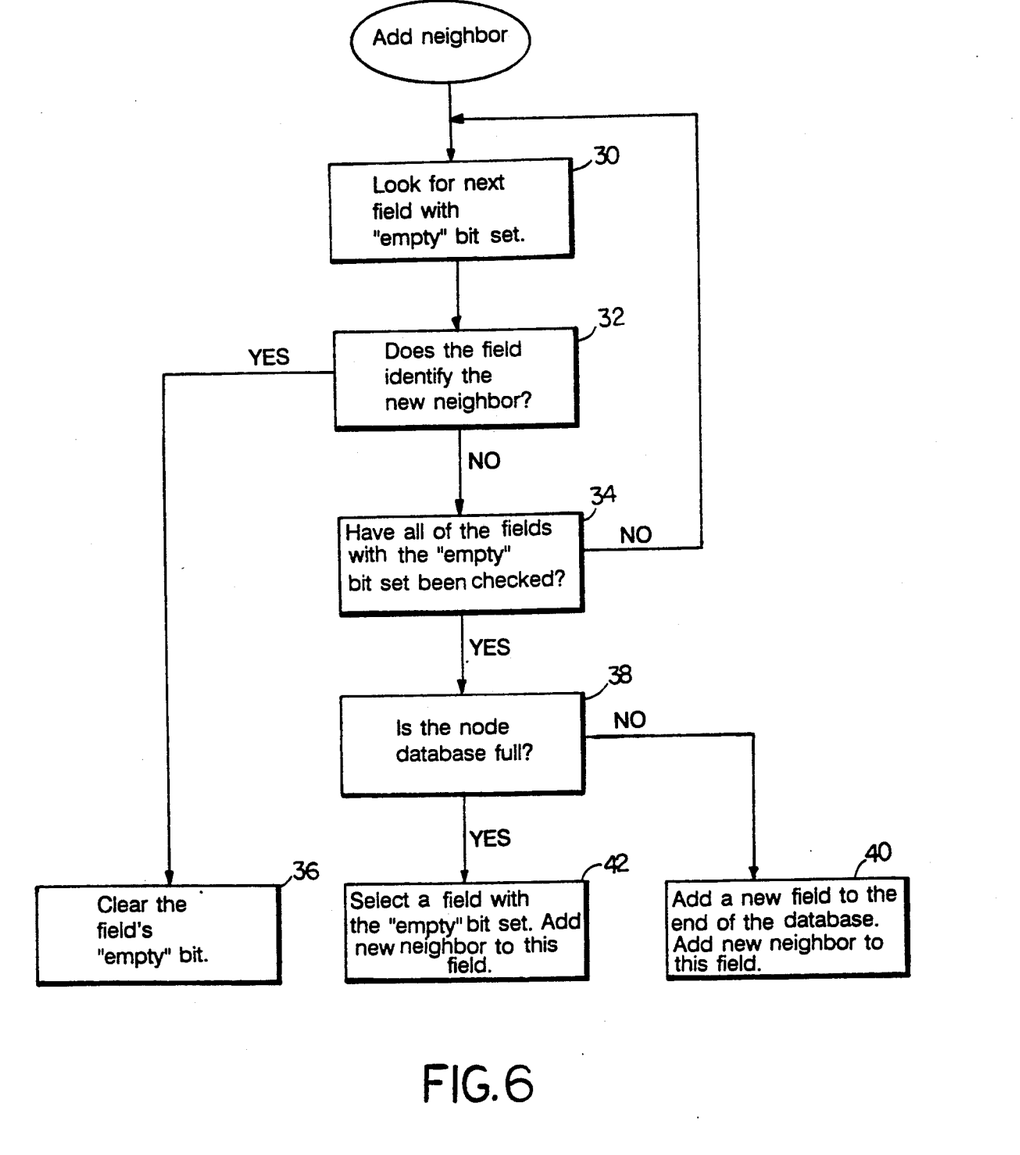
FIG. 6 is a flow chart of an algorithm for adding neighbors to the fields of the link state database of FIGS. 5A through 5C.

Referring to FIG. 6, in one algorithm, when a neighbor is to be added to the link state database 20, a loop 30, 32, 34 examines the fields in the database which have the empty bit set. Each field is checked 32 to determine if it identifies the neighbor to be added (i.e., if the neighbor to be added had previously occupied the field). If such a field is found, the algorithm clears 36 that field's empty bit, thus re-incorporating the neighbor into the database and the LSP fragments.

If no such field is found, and all of the fields with the empty bit set have been checked (i.e., the answer at step 34 is "yes"), the algorithm checks 38 if the link state database is full. That is, the algorithm checks if there is storage space in the link state database for another field. If the database is not full, a new field is added 40 to the database, and the new neighbor is added to this field. However, if the database is full, then one of the "empty" fields must be "garbage collected" and used to store the new neighbor. For this purpose, the algorithm selects 42 a field with the empty bit set, and adds the new neighbor to this field. The selection strategy may be random, or, preferably, the selection may be done on a "least recently used" basis. In the latter embodiment, each of the "empty" fields indicates the length of time that they have been marked as empty, and the one that has been marked as empty for the longest time is used to store the new neighbor.

The algorithm of FIG. 6 assumes that the node database has more fields than the total number of links that may be connected to the node. In an alternative embodiment, the algorithm can be modified so that, if this assumption is false, an error is generated. In this embodiment, the algorithm returns an error if, during step 42, a field with the empty bit set is not found.

The above algorithm for adding and removing fields in the node database 20 reduces the extent to which the contents of the neighbor fields move in the database and in the fragments; the removal or addition of a neighbor does not affect the positions of the other neighbors in the database or in the fragments. This feature enhances the benefits of fragmentation: when the state of one link changes, the contents of only one fragment will be affected by the change.

If the addition or subtraction of one link caused the location of many neighbors to change (as is the case in known methods for adding and removing neighbors), the contents of many of the fragments would change. Thus many fragments would have to be updated in response to a change of state of a single link; as a result, transmission overhead would be increased.

The algorithm of FIG. 6 also reduces the possibility that a field for a particular neighbor may move from one LSP fragment to another LSP fragment. Such movements can result in error conditions. For example: if node A's neighbor B moved from node A's LSP fragment X to node A's LSP fragment X−1, node A would have to broadcast new versions of fragment X and fragment X−1 to the network, because the contents of both fragments changed. If fragment X were broadcast to the network first, for some period of time before fragment X−1 was received by the network, the network would be unaware of the link between A and B, because the old version of fragment X−1 would not indicate the existence of the link, and the new version of fragment X−1 would not yet have been received. This situation may cause an error if a node in the network attempts to route a packet based on the erroneous assumption that there is no link between node A and node B.

As discussed above, it may often be desirable to use CSNPs to compare the contents of the link state databases of two routers, for example, two neighboring routers. Some particular situations where a CSNP comparison may be desirable are as follows: (1) When a link is activated, the link state databases of the two routers that are newly connected by the link should be compared. For this purpose, one or both of the connected routers may transmit CSNPs to the other router. (2) When a new router is first activated (and thus has an empty link state database), the new router's neighbors should provide the new router with their stored LSPs. For this purpose, the new router may transmit an "empty" CSNP to its neighbors, thus requesting an update. (3) On a Local Area Network (LAN), the designated router (which is responsible for routing and "housekeeping" duties for the LAN) should regularly verify that all of the other LAN routers have received recently transmitted LSPs. (This is necessary because routers on a LAN do not send acknowledgement messages acknowledging the receipt of LSPs). For this purpose, the designated router broadcasts a CSNP to the other routers on the LAN.

Figure 7A:
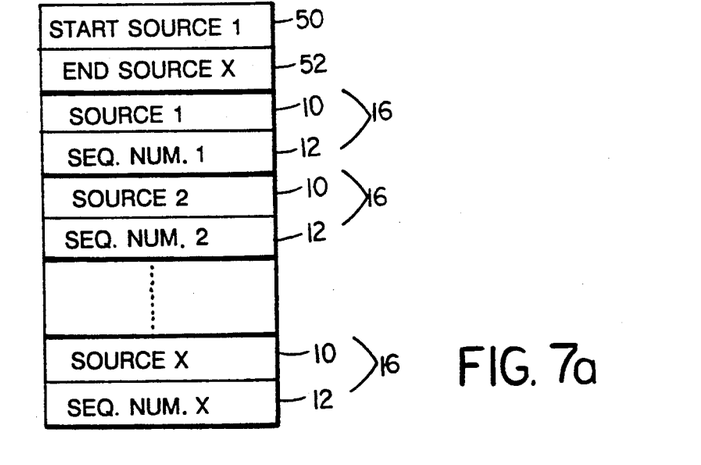
FIGS. 7A through 7C illustrate the contents of CSNP fragments.
Figure 7B:
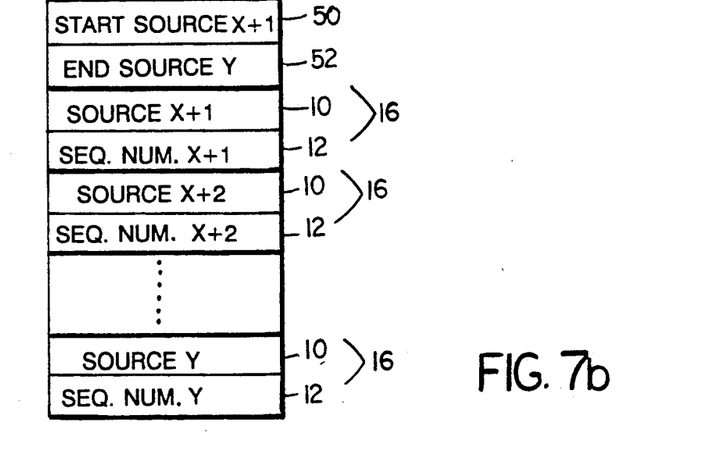
Figure 7C:
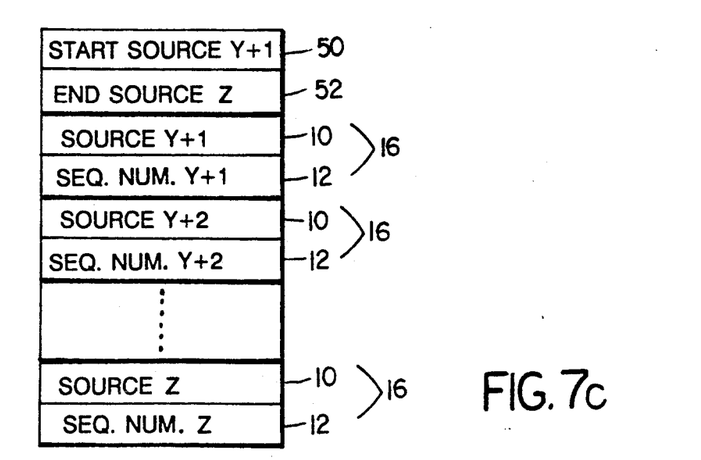

In large networks, there may be many routers, and thus the network's CSNPs may become very large. The problems that can be caused by large LSPs may also be caused by large CSNPs. Therefore, in an aspect of the invention, large CSNPs are avoided by dispersing the information contained in the CSNP, and transmitting it in several CSNP fragments. These CSNP fragments are illustrated in FIGS. 7A through 7C. Each CSNP fragment includes several of the pairs 16 included in the complete CSNP of FIG. 2. However, the order of the pairs 16 in the CSNP fragments is not necessarily the same as the order of the fragments in the complete CSNP.

Figure 8:
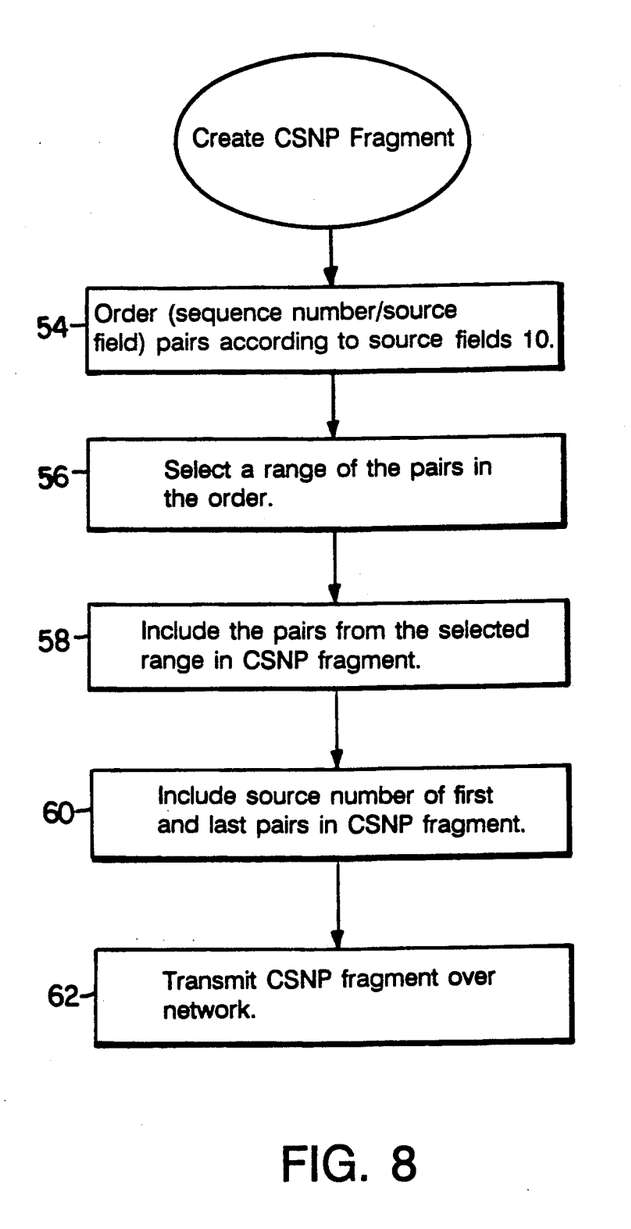
FIG. 8 is a flow chart illustrating the creation of a CSNP fragment.

In CSNPs, the order in which the pairs 16 appear is usually random (and typically depends on the order in which the LSPs were added to the originating router's link state database). Referring to FIG. 8, when creating CSNP fragments, these pairs 16 are ordered 54. Any suitable ordering scheme (e.g., an alphabetical or numeric scheme) may be used. In a preferred embodiment, the source fields 10 of the pairs 16 are used to determine an ordering of the pairs. Once all of the pairs 16 are ordered, a range of the pairs (e.g., all pairs with source fields numbered 1 through 10) is selected 56, and those pairs 16 in the selected range are included 58 in a CSNP fragment and transmitted 62.

For the sake of example, the first CSNP fragment, shown in FIG. 7A, may include the pairs from the sources numbered 1 through X, the second CSNP fragment, shown in FIG. 7B, may include the pairs from sources numbered X+1 through Y, and the third CSNP fragment, shown in FIG. 7C, may include the pairs from the sources numbered Y+1 through Z (where X<Y<Z). Note that, although all of the pairs 16 in the selected range are placed in the CSNP fragment, within the CSNP fragment, the pairs do not have to appear in order (i.e., they do not have to be sorted) as shown in FIGS. 7A through 7C. If desired, the pairs may be randomly arranged within the CSNP fragment. However, it is preferred to sort the pairs in the CSNP fragment to increase the efficiency with which the CSNP fragment may be parsed and compared to a receiving router's link state database.

To facilitate comparison, two additional fields 50, 52 are included 60 in the header of the CSNP fragments. These fields indicate the range of pairs 16 included in the CSNP fragment. Field 50 indicates the source number (or name) of the numerically (or alphabetically) first pair 16 included in the CSNP fragment. Field 52 indicates the source number (or name) of the numerically (or alphabetically) last pair 16 included in the CSNP fragment. For example, in FIG. 7A, field 50 indicates that source 1 is the start of the range in the CSNP fragment, and field 52 indicates that source X is the end of the range of the CSNP fragment.

The inclusion of fields 50, 52 allows the CSNP fragments to be autonomous, in that their contents are well defined, and can be used independently of the other fragments. This aspect is discussed in more detail below.

When required by the routing algorithm (e.g., under any of the conditions set forth in the background above), a router forms a CSNP fragment, and transmits it to one or more of the other routers in the network. The receiving router first compares the CSNP fragment to the receiving router's link state database to determine whether LSPs for all of the sources mentioned in the CSNP fragment are stored in the receiving router's link state database. This comparison allows the receiving router to determine if there are any LSPs (in the range of the CSNP fragment) stored in the link state database of the router that originated the CSNP, but not stored in the link state database of the receiving router. If there is a LSP missing (i.e., not stored in the receiving router's link state database), the receiving router may, for example, send a packet to the router that originated the CSNP, requesting a copy of the missing LSP.

The receiving router also compares the sequence numbers in the received CSNP fragment to the sequence numbers in the receiving router's link state database. This comparison allows the receiving router to determine the relative age of the LSPs (in the range of the CSNP fragment) stored by the receiving router and by the originating router. If a LSP stored by the receiving router has a higher (i.e., more recent) sequence number than that supplied by the corresponding field 12 of the received CSNP fragment, the receiving router may (possibly depending on the magnitude of the difference between the sequence numbers) send a copy of the more recent LSP to the router which originated the CSNP. Similarly, if a LSP stored by the receiving router has a lower (i.e., less recent) sequence number than that supplied by the corresponding field 12 of the received CSNP fragment, the receiving router may send a packet to the router that originated the CSNP requesting a copy of the more recent LSP.

Finally, the receiving router checks if any other LSPs in its link state database lie in the range specified by the CSNP fragment, but do not appear in the CSNP fragment. This check allows the receiving router to determine if there are any LSPs (in the range of the CSNP fragment) that are stored in the link state database of the receiving router, but are not stored in the link state database of the router that originated the CSNP fragment. If there is a LSP missing (i.e., stored in the receiving router's link state database but not appearing in the CSNP fragment), the receiving router may, for example, send a copy of the missing LSP to the router which originated the CSNP. This last step in particular is made possible by the inclusion of range fields.

In this way, a router receiving a CSNP fragment is able to compare a portion of its link state database to a corresponding portion of the link state database of the router that originated the CSNP fragment. The comparison is as accurate as that provided by known CSNP schemes, but can be made from a single CSNP fragment without regard for the contents of other fragments because the comparison is limited to a range of the LSPs. Therefore, the CSNP fragments do not all have to be received in order to compare the two databases, and, as a result, only some of the CSNP fragments need by transmitted or received at any one time.

A CSNP fragment comparison such as discussed above is limited to a specified range of the two databases, and is thus necessarily incomplete. However, even when a complete CSNP is used to compare two databases, the resulting comparison is only approximate, because the time delays caused by transmission make the CSNP sequence numbers invalid before the CSNP arrives at the receiving node. Thus, database comparisons performed through CSNP fragments (for example, by transmitting a sequence of fragments having ranges which span the entire database) are not necessarily less accurate than comparisons performed with complete CSNPs. A fragment based comparison may in fact be more accurate, because of the reduced transmission overhead (and thus less delay) incurred in transmitting and comparing the smaller fragments.

Other Embodiments

Embodiments other than those described above are within the scope of the following claims.

The contents of the CSNP and LSP fragments need not be mutually exclusive; rather, some neighbor fields may be included in more than one fragment.

Other information may be included in LSP fragments. As discussed above, the LSP fragments may include link state information in addition to, or instead of, an indication of whether the link is operable or inoperable. For example, the fragment may include link performance parameters such as "cost". Although described in terms of updating link operability information, the methods described herein are equally applicable to updating these other types of link state information.

Furthermore, LSP or CSNP fragments may include other fields, for example, fields for verifying the contents of the fragments or for aging and invalidating the fragments. In particular, U.S. Patent Application 07/398,347 of Radia J. Perlman filed Aug. 24, 1989 for "Robust Packet Routing over a Distributed Network Containing Malicious Failures", incorporated by reference herein, and U.S. Patent application Ser. No. 07/364,470 of Radia J. Perlman et al. filed June 9, 1989 for "Reliable Broadcast of Information in a Wide Area Network", incorporated by reference herein describe additional information which may be included in CSNP or LSP fragments, and algorithms for using this information to enhance the robustness and error recovery of networks.

Other embodiments are within the scope of the following claims.

Note that the "state" of a link, as used above, is information as to whether the link is operative or inoperative; however, a link state fragment may also include other information about the link such as its "cost", and the invention may be applied to updating these other types of link state information.

What is claimed is:

1. A method for updating, at a first node of a network of nodes interconnected by links, stored information used for routing packets at said first node, comprising
   a. receiving a link state packet at said first node, said packet indicating the states of links connected to a given node in said network,
   b. attempting, at said first node, to derive from the link state packet received in step (a), the states of the links connected to said given node, and
   c. if the states of fewer than all of the links connected to said given node are derived in step (b), updating said stored information used for routing packets using the derived link states without regard to other link state packets sent to said first node.

2. The method of claim 1 wherein
   d. if the states of all of the links connected to said given node are derived in step (b), updating said stored information used for routing packets using the derived link states.

3. The method of claim 1, wherein said given node originates, and sends toward said first node, the packet received in step (a).

4. The method of claim 3, further comprising,
   d. if a given link connected to said given node changes from a first state to a second state, determining whether the first state of said given link was indicated in a packet previously sent toward said first node, and
      i. if the first state of said given link was indicated in a packet previously sent toward said first node, originating, at said given node, a replacement packet, said replacement packet indicating the change of state of said given link but not indicating the states of all other links connected to said given node, or
      ii. if the first state of said given link was not indicated in a packet previously sent toward said first node, originating, at said given node, a new link state packet indicating that said given link is in said second state but not indicating the states of all links connected to said given node, and
      iii. sending said replacement packet or said new packet toward said first node.

5. The method of claim 4, wherein
   if said replacement packet is sent in step, an indicator indicating the changes represented by the replacement packet is stored.

6. The method of claim 5, wherein said indicator is stored in said given node.

7. The method of claim 5, further comprising
   e. if said given link subsequently changes form said second state back to said first state, retrieving said stored indicator, forming a further replacement packet by removing the changes indicated by said indicator, and sending said further replacement packet toward said first node.

8. The method of claim 7, wherein
   in said first state, said link is operative, and in said second state said link is inoperative,
   each link state packet indicates that a link connected to said given node is operative by identifying one or more nodes that are connected to the operative link, and indicates that a link connected to said given node is inoperative by omitting identification of any nodes that are connected to the inoperative link, and
   said indicator comprises a field for identifying a node and a flag bit for indicating the operability of the link connecting the identified node to said given node.

9. The method of claim 1 adapted to update, at a second node of said network, stored information used for routing packets at said second node, further comprising
   d. forwarding the link state packet received by said first node in step (a) from said first node to said second node,
   e. attempting, at said second node, to derive from said link state packet forwarded in step (d), the states of said links connected to said given node,
   f. if the states of all of the links connected to said given node are derived in step (e), updating said stored information used for routing packets at said second node using the derived link states, and
   g. if the states of fewer than all of the links connected to said given node are derived in step (e), updating said stored information used for routing packets at said second node using the derived link states.

10. The method of claim 1, further comprising
    d. receiving additional link state packets at said first node, each of said additional link state packets indicating the states of one or more links connected to said given node, not all of said packets indicating the states of the same links.

11. The method of claim 10, wherein each of said additional link state packets includes a fragment number for identifying the packet among the additional packets.

12. The method of claim 11, wherein the link state packets received in steps (a) and (d) identify said given node.

13. The method of claim 12, wherein each link state packet received in steps (a) and (d) includes a sequence number establishing a relative age of the packet compared to other packets identifying said given node and having the same fragment number.

14. The method of claim 1, wherein said given node is identified within each said packet.

15. The method of claim 1, wherein said link state packet indicates that a link connected to said given node is operative by identifying one or more other nodes that are connected to the operative link.

16. The method of claim 1, further comprising
    d. if a link connected to said given node changes from a first state to a second state, sending toward said first node a packet indicating that said changed link is in said second state.

17. The method of claim 16, wherein said given node originates and sends the packets which are received in step (a) and sent in step (d).

18. A method for updating, at a first node of a network of nodes interconnected by links, a database of link operability information, comprising
   a. sending one or more link state packets to said first node, each said packet
      identifying a given node in said network and the operable states of links connected to said given node, not all of said packets identifying the operable states of the same links, and
      including a fragment number identifying the packet and a sequence number establishing a relative age of the packet compared to other packets having the same fragment number.
   b. attempting, at said first node, to derive from the packet or packets sent in step (a), the operable states of the identified links, and
   c. if the operable states of all of the links connected to said given node are derived in step (b), updating said database using the operable states derived in step (b),
   d. if the operable states of fewer than all of the links connected to said given node are derived in step (b), updating said database using the operable states derived in step (b), and then
   e. routing packets at said first node in response to the contents of the updated database.

19. A method for updating, at a first node of a network of nodes interconnected by links, a database of information describing operative links connecting nodes in said network, comprising
   a. sending one or more link state packets from a given node in said network to said first node, each said packet
      identifying said given node and one or more nodes that are connected by operative links to said given node, not all of said packets identifying the same nodes,
      including a fragment number identifying the packet and a sequence number establishing a relative age of the packet compared to other packets having the same fragment number,
   b. attempting, at said first node, to derive from the packet or packets sent in step (a), the identity of the nodes connected by operative links to said given node, and
   c. if all of the nodes connected by operable links to said given node are derived in step (b), updating said database using the node identities derived in step (b),
   d. if fewer than all of the nodes connected by operable links to said given node are derived in step (b), updating said database using the node identities derived in step (b), then
   e. routing packets at said first node in response to the contents of the updated database,
   f. if a node identified by a packet sent in step (a) is no longer connected by an operative link to said given node, sending to said first node a replacement packet, said replacement packet not identifying the omitted node, and storing the identity of the omitted node, and
   g. if the node omitted from the replacement packet sent in step (f) subsequently becomes connected by an operative link to said given node, retrieving the identity of the omitted node, forming a further replacement packet by adding said omitted node to said amended packet, and sending said further replacement packet to said first node.

20. A method for organizing information concerning the states of links interconnecting nodes of a network of nodes, said information grouped into link state packets each indicating the states of links connected to a respective source node which generated the link state packet, comprising
   ordering said link state packets,
   selecting a range of said link state packets in said order, and
   forming a summary including
      information indicating the boundaries of said selected range, and
      information identifying each link state packet in said selected range.

21. The method of claim 20, wherein the ordering of said link state packets is performed in accordance with the identity of the respective source nodes of said link state packets.

22. The method of claim 20, wherein each said link state packet identifies its respective source node.

23. The method of claim 22, wherein the information identifying each said link state packet comprises the identity of the link state packet's respective source node.

24. The method of claim 23, wherein the ordering of said link state packets is performed in accordance with the identity of the respective source nodes of said link state packets.

25. The method of claim 24, wherein the boundaries of said selected range are indicated by the identities of the respective source nodes of the link state packets at the extremes of said range.

26. The method of claim 20, wherein each said link state packet identifies its respective source node and includes a sequence number indicating a relative age of the link state packet compared to other packets having the same respective source node.

27. The method of claim 26, wherein the information identifying each said link state packet comprises the identity of the packet's respective source node and its sequence number.

28. The method of claim 27, wherein the ordering of said link state packets is performed in accordance with the identities of their respective source nodes.

29. The method of claim 28, wherein the boundaries of said selected range are indicated by the identities of the respective source nodes of the link state packets at the extremes of said range.

30. The method of claim 20 applied to the initialization of a new link which is activated between first and second nodes in said network, comprising
   organizing, at said first node, a summary of link state packets in accordance with the method of claim 23, said summary identifying each link state packet stored by said first node,
   transmitting said summary to said second node, and
   comparing, at said second node said summary and the link state packets stored by said second node,
   whereby said second node may determine which packets being stored by said first node are not being stored by said second node, and which packets being stored by said second node are not being stored by said first node.

31. The method of claim 20 applied to the initialization of a new node in said network, comprising organizing, at a neighboring node connected by a link to said new node, a summary of link state packets in accordance with the method of claim 23, said summary identifying each link state packet stored by said neighboring node, transmitting said summary to said new node, and comparing, at said new node, said summary and the link state packets stored by said new node, whereby said new node may determine which packets being stored by said neighboring node are not being stored by said new node and which packets being stored by said new node are not being stored by said neighboring node.

32. The method of claim 20 applied to the verification of link state packets on a local area network, comprising organizing, at a designated router of said local area network, a summary of link state packets in accordance with the method of claim 23, said summary identifying each link state packet stored by said designated router, sending said summary to a second router on said local area network, and comparing, at said second router, said summary and the link state packets stored by said second router, whereby said second router may determine whether link state packets have been reliably received over said local area network.

33. Apparatus for updating, at a first node of a network of nodes interconnected by links, stored information used for routing packets at said first node, comprising means for receiving a link state packet at said first node, said link state packet indicating the state one or more given links connected to a given node in said network but not indicating the states of all links connected to said given node, means for deriving from the packet or packets received by said receiving means, the state of said given links, and means for updating said stored information used for routing packets using the derived states of said given links without regard to other link state packets sent to said first node.

34. Apparatus for organizing information concerning the states of links interconnecting nodes of a network of nodes, said information grouped into link state packets each indicating the states of links connected to a respective source node which generated the link state packet, comprising means for ordering data identifying said link state packets, means for selecting a range of said identifying data in said order, and means for forming a summary including information indicating the boundaries of said selected range, and each element of identifying data within said selected range.

* * * * *

UNITED STATES PATENT AND TRADEMARK OFFICE
CERTIFICATE OF CORRECTION

PATENT NO.   : 5,128,926

DATED        : July 7, 1992

INVENTOR(S)  : Radia J. Perlman et al.

It is certified that error appears in the above-identified patent and that said Letters Patent is hereby corrected as shown below:

On the title page, item [56],

References Cited (OTHER PUBLICATIONS)
McQuillan et al., "Arpanet" should read --ARPANET--.

Column 1, line 14, "FILED" should read --filed--.
Column 2, line 7, "LSP based" should read --LSP-based--.
Column 2, line 54, "routers" should read --router--.
Column 2, line 59, "re assembles" should read --re-assembles--.
Column 2, line 61, "re splitting" should read --re-splitting--.
Column 5, line 33, insert --)-- after "fragments".
Column 6, line 44, insert --,-- (comma) after "20".
Column 10, line 29, "by" should read --be--.

Column 11, line 64, claim 5, insert --(d)(i)-- after "step".
Column 14, line 60, claim 30, insert --,-- (comma) after "node".
Column 15, line 19, claim 32, "23" should read --20--.

UNITED STATES PATENT AND TRADEMARK OFFICE
CERTIFICATE OF CORRECTION

PATENT NO. : 5,128,926

DATED : July 7, 1992

INVENTOR(S) : Radia J. Perlman et al.

It is certified that error appears in the above-identified patent and that said Letters Patent is hereby corrected as shown below:

Column 16, line 4, claim 33, insert --of-- between "state" and "one".

Signed and Sealed this

Twelfth Day of October, 1993

Attest:

BRUCE LEHMAN

*Attesting Officer*    *Commissioner of Patents and Trademarks*